(12) United States Patent
Evans

(10) Patent No.: US 12,008,063 B2
(45) Date of Patent: Jun. 11, 2024

(54) SYSTEM AND METHOD FOR THOUGHT LEADER AND INFLUENCER RATING AND RANKING

(71) Applicant: Nicholas Evans, Highland Villiage, TX (US)

(72) Inventor: Nicholas Evans, Highland Villiage, TX (US)

(*) Notice: Subject to any disclaimer, the term of this patent is extended or adjusted under 35 U.S.C. 154(b) by 0 days.

(21) Appl. No.: 16/157,086

(22) Filed: Oct. 10, 2018

(65) Prior Publication Data
US 2022/0215059 A1  Jul. 7, 2022

Related U.S. Application Data

(60) Provisional application No. 62/570,622, filed on Oct. 10, 2017.

(51) Int. Cl.
| | | |
|---|---|---|
| *G06F 16/958* | (2019.01) | |
| *G06F 16/9536* | (2019.01) | |
| *G06F 16/954* | (2019.01) | |
| *G06Q 50/00* | (2012.01) | |

(52) U.S. Cl.
CPC ........ *G06F 16/958* (2019.01); *G06F 16/9536* (2019.01); *G06F 16/954* (2019.01); *G06Q 50/01* (2013.01)

(58) Field of Classification Search
CPC .. G06F 16/958; G06F 16/9536; G06F 16/954; G06Q 50/01
See application file for complete search history.

(56) References Cited

U.S. PATENT DOCUMENTS

| | | | |
|---|---|---|---|
| 11,328,368 B1* | 5/2022 | Labrie | G06Q 10/1095 |
| 2019/0188733 A1* | 6/2019 | Rao | G06N 20/00 |
| 2019/0311418 A1* | 10/2019 | Pandit | G06Q 50/01 |
| 2019/0370908 A1* | 12/2019 | Soong | G06Q 30/0201 |
| 2020/0027171 A1* | 1/2020 | Oren | G06Q 50/01 |
| 2020/0104337 A1* | 4/2020 | Kelly | H04L 51/52 |
| 2020/0311755 A1* | 10/2020 | Postrel | G06F 16/9535 |
| 2021/0150541 A1* | 5/2021 | Gurbuxani | G06N 3/0454 |
| 2022/0124411 A1* | 4/2022 | Saxena | G06Q 30/0241 |

\* cited by examiner

*Primary Examiner* — Joe Chacko
(74) *Attorney, Agent, or Firm* — Thrasher Associates

(57) ABSTRACT

The invention provides an open platform for thought leaders and influencers to collaborate, curate, manage, promote, and share their expertise over a communications network, such as the Internet. The thought leaders are evaluated across multiple dimensions of their roles as an academic, author, entrepreneur, inventor, influencer and/or speaker, as well as in various functional domains. The rating and ranking is achieved by curating, measuring and analyzing their published thought leadership content portfolio across the Internet via a points-based system. Further, the invention provides business entities and service providers ways to both finding the world's top thought leaders, and nurture their own thought leaders.

2 Claims, 20 Drawing Sheets

FIGURE 6

Add Opportunity (Public Speaking)

Title

Location _____  Date Required Month ▼ Day ▼ Year ▼

Requirements

Audience Size 0-50 ▼   Payment Up to $500 ▼

Contact Name _____   Contact E-Mail _____
Company Name _____   Company Website _____

[Save]

FIGURE 7

Recent Listings

| Opportunity title, industry or function | Location | Search |

Innovation Culture Speaker  Submitted 5 days ago

Location: San Francisco, CA  Date Required: October 14th 2017

Industry Association | Technology Services

*Public Speaking*

---

IoT Whitepaper  Submitted 7 days ago

Location: Virtual  Date Required: ASAP

IT Services | Technology Services

*Authoring / Freelancing*

FIGURE 8

Innovation Culture Speaker  Submitted 5 days ago

Hiring Company [Get for 1 Point]    Contact Info [Get for 2 Points]

About the Opportunity

Location: San Francisco, CA    Date Required: October 14th 2017

Requirements: Preferably VP level and above, published innovation author, available videos for review

Audience Size: 200-250    Payment: Up to $7,500 plus expenses

About the Company

Industry Association | Technology Services

*Public Speaking*

FIGURE 9

Thought Leader | Standings: Overall for October

| Pos | Name | Country | Pts | Change (vs. Sep) | Blogs / Articles / Interviews | 🔲 | 🔲 |
|---|---|---|---|---|---|---|---|
| | Nicholas D Evans | US | 100 | ^3 | +1 / - / +2 | +567 | +1,799 |
| | John Smith | US | 97 | v1 | +1 / +2 / - | +435 | +1,034 |
| | David Jones | UK | 94 | v1 | +2 / +1 / +1 | +344 | +534 |
| | Frank Davis | AUS | 88 | ^2 | +1 / +1 / +1 | +233 | +456 |
| | Tom West | GER | 87 | ^1 | +2 / - / - | +190 | +78 |

■ Corporate  ■ Technology  ■ Federal

SYSTEM AND METHOD FOR THOUGHT LEADER AND INFLUENCER RATING AND RANKING

CLAIM OF PRIORITY, IDENTIFICATION OF RELATED APPLICATIONS

This Patent Application claims priority from U.S. Patent Application No. 62/570,622 filed on Oct. 10, 2017 entitled SYSTEM AND METHOD FOR THOUGHT LEADER RATING, RANKING AND OPPORTUNITY SHARING, to common inventor Evans.

FIELD OF THE INVENTION

Embodiments of the invention are generally related to computer systems, enterprise software, and user-computer interaction and collaboration, and are particularly related to systems and methods related to thought leader and influencer evaluation.

PROBLEM STATEMENT AND HISTORY

Interpretation Considerations

This section describes technical field in detail and discusses problems encountered in the technical field. Therefore, statements in the section are not to be construed as prior art.

Discussion of History of the Problem

The social world today abounds in internet 'influencers.' From the Kardashians on cable TV—and now YouTube—to a host of lesser-known niche-influencers (who are followed as passionately by their own smaller audiences), influencers have won a place on the internet and in marketing (indeed, one Kardashian is now worth over $100 Million based on cosmetics sales exclusively through her YouTube channel). While internet influencers are readily identifiable, professionals with influence have traditionally been less so—until the recent emergence of "thought leaders."

Thought leaders have recently become an identifiable characteristic separate and apart from an influencer. And, while influencers abound, their notoriety largely measures the size of their following, and is not a true measure of "thought leadership." By contrast, thought leaders are known respected in fields based on their recognized deep mastery of content, their ability to project their field into the future, and their prolific communication skills (whether in writing, audio, video or all of these) among other attributes. Because thought leaders do not necessarily have large followings or platforms, there is not a node to measure, promote and advance their expertise.

In addition, today's systems for finding influencers and for measuring their influence is flawed because while they may look across multiple social media channels in coming up with influencer ratings and rankings (e.g. Instagram, LinkedIn, Twitter, YouTube), they are still limited to a social media perspective which can be manipulated to grow artificially, such as via purchase of fake followers, sharing non-original or $3^{rd}$ party content, or excessive/duplicative posts.

Opportunities for thought leaders to advance their impact and audience are limited because contacts and opportunities are, more often than not, hidden from their view. These unpublished contacts and opportunities for thought leaders are typically in the field of authoring opportunities, media opportunities and speaking opportunities, as well as other opportunities pertinent to their profession.

In addition, thought leadership is often confused with mere influence (i.e. number of followers), or partial measures such as public speaking.

Further, in the rush to find outside experts (aka 'external influencers'), corporations often miss an opportunity to identify, cultivate and manage their own internal thought leaders.

Once a specialized art, practiced by only a few, thought leadership is now a widespread discipline—and actually aspired to by many (witness the ongoing "guru" movements). However, the current thought leadership "ecosystem" is highly-fragmented and often closed to outsiders. Here's just one example: many of the same thought leaders circulate in a handful of outlets and publications such as Harvard Business Review, LinkedIn, McKinsey, TED, Washington Speakers Bureau, and Wiley. Meanwhile, many should-be thought leaders aren't social media stars, Harvard Business Review authors, LinkedIn Influencers or TED speakers, but are leading authorities in their fields. They need new, discrete measures of success which recognize the multi-faceted role of the thought leader beyond simple metrics such as number of followers, likes and shares.

Accordingly, there exists the need for systems and methods for discretely identifying, rating and ranking thought leaders in a manner that works with enterprises to identify outside thoughts leaders while promoting their own internal thought leaders. The present invention provides such systems and methods.

BRIEF DESCRIPTION OF THE DRAWINGS

Various aspects of the invention and its embodiment are better understood by referring to the following detailed description. To understand the invention, the detailed description should be read in conjunction with the drawings, in which:

FIG. 6 shows a sample online form for how the points system can be managed and maintained within the computer software application by the application administrator.

FIG. 7 shows a sample online form for submitting unpublished opportunities with the public speaking opportunity chosen as an example.

FIG. 8 shows a sample opportunity listing report with sample search criteria provided as an example.

FIG. 9 shows a sample opportunity detail form with sample points redemption buttons provided as an example.

FIG. 15 shows a sample thought leader standings report used in the enterprise edition of the interactive website.

DEFINITIONS

Figure 1:
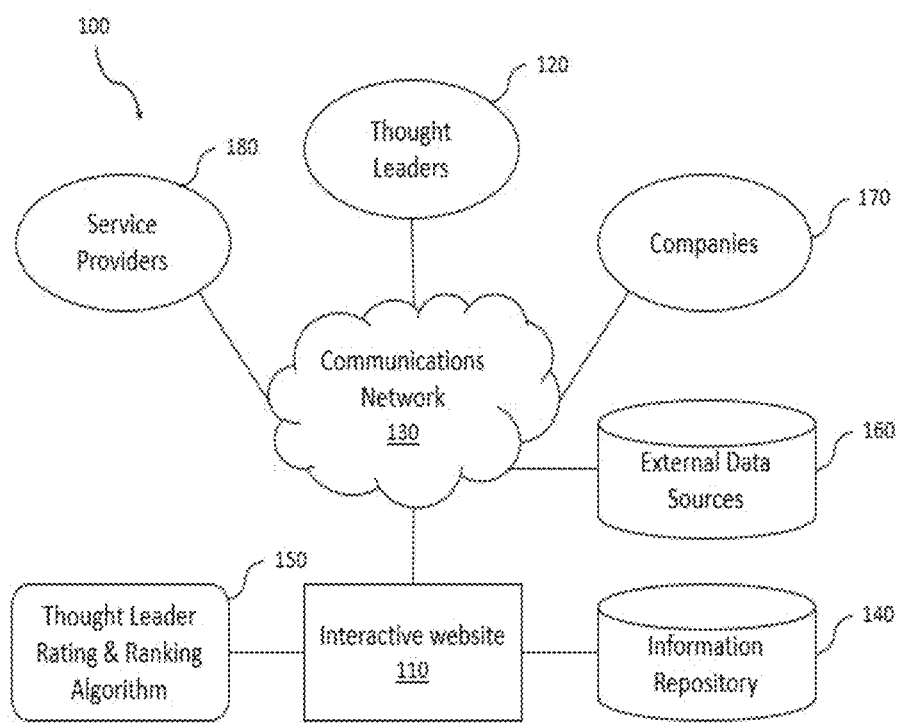
FIG. 1 shows the collection of online systems, communication networks, applications, algorithms, databases, external data sources and users of these systems and applications comprising the invention.

Thought Leader—a person such as a professional who is recognized for introducing new ideas into their fields of expertise, and who has gained a certain level of audience and impact.

Measurement Dimensions—dimensions for rating and ranking may include role-based domains (including roles such as academic, author, entrepreneur/inventor, influencer and speaker) or functional domains (including topic areas such as business strategy, technology strategy, digital transformation, emerging technology, disruptive technology, open innovation, innovation management, mobile, social, analytics, cloud, internet of things, artificial intelligence, intelligent automation, blockchain, and cybersecurity, for example).

Influencer—an individual recognized for having a large follower base on social media which they can influence.

Expert—vernacularly, an individual who has achieved a certain level of proficiency in at least one domain. While an expert possesses a proficiency in a certain discipline, he/she may not be a thought leader because they lack a platform for widely communicating a vision for that discipline.

Unpublished Opportunities—opportunities that are not widely published or advertised, but are passed from one person to another, either directly or via an intermediary.

Internal Thought Leaders—Thought Leaders who are employees or contractors of a specific company.

Thought Leadership Portfolio—A preferably electronic library of a thought leader's collected works from a plurality of dimensions, including contributions as an academic, author, entrepreneur/inventor, influencer and/or speaker.

Information Repository—Examples of information repositories include web servers, databases, and file systems, for example.

External Data Sources/External Resources—These include structured or unstructured contents such as user generated content within bulletin boards, forums, social networks, information compendia, publications, etc. Further resources include metadata such as keywords, tags, publications, or user generated content (e.g. postings, comments, etc.).

DESCRIPTION OF AN EXEMPLARY PREFERRED EMBODIMENT

Interpretation Considerations

While reading this section (An Exemplary Embodiment, which describes the exemplary embodiment of the best mode of the invention, hereinafter referred to as "exemplary embodiment"), one should consider the exemplary embodiment as the best mode for practicing the invention during filing of the patent in accordance with the inventor's belief. As a person with ordinary skills in the art may recognize substantially equivalent structures or substantially equivalent acts to achieve the same results in the same manner, or in a dissimilar manner, the exemplary embodiment should not be interpreted as limiting the invention to one embodiment.

The discussion of a species (or a specific item) invokes the genus (the class of items) to which the species belongs as well as related species in this genus. Similarly, the recitation of a genus invokes the species known in the art. Furthermore, as technology develops, numerous additional alternatives to achieve an aspect of the invention may arise. Such advances are incorporated within their respective genus and should be recognized as being functionally equivalent or structurally equivalent to the aspect shown or described.

A function or an act should be interpreted as incorporating all modes of performing the function or act, unless otherwise explicitly stated. An algorithm may be implemented in a module, which may comprise software or hardware (such as logic gates), to perform a specific task. The modules and/or algorithms may transform a general computing device into a specific task machine.

Unless explicitly stated otherwise, conjunctive words (such as "or", "and", "including", or "comprising") should be interpreted in the inclusive and not the exclusive sense.

As will be understood by those of the ordinary skill in the art, various structures and devices are depicted in the block diagram to not obscure the invention. In the following discussion, acts with similar names are performed in similar manners, unless otherwise stated.

The foregoing discussions and definitions are provided for clarification purposes and are not limiting. Words and phrases are to be accorded their ordinary, plain meaning, unless indicated otherwise.

Description of the Drawings

FIG. 1 shows one embodiment 100 of the invention having online systems, communication networks, applications, algorithms, databases, external data sources and users of these systems and applications. As illustrated by FIG. 1, the invention includes an online website (or any other system for user input/output including web or mobile Apps, and thin clients, for example) or exchange 110 by which established or aspiring thought leaders (collectively "thought leaders") 120 can promote and share their expertise over a communications network 130, such as the Internet. Here, for example, the thought leaders 120 may find, share and submit unpublished contacts and opportunities pertinent to their profession via, for example, a points-based system. The thought leaders 120 may also be rated and ranked as a thought leader in various topic areas overall, as well as across both role-based domains and functional domains.

The online website 110 achieves this functionality by use of an information repository 140, a thought leader rating and ranking algorithm 150, and by accessing external data sources 160 as needed over the communications network 130. Also, the invention enables companies 170 to find and work with thought leaders 120, as well as to identify, cultivate and manage their own internal experts and thought leaders. Furthermore, service providers 180 many use an online website to interact with these thought leaders 120 and exchange products and services in an online exchange or marketplace setting.

Three processes within the invention therefore pertain to a) sharing unpublished thought leader opportunities, b) rating and ranking thought leaders via the use of an electronic algorithm, and c) identifying, cultivating and managing internal thought leaders.

Process for Sharing Unpublished Thought Leader Opportunities

Figure 2:
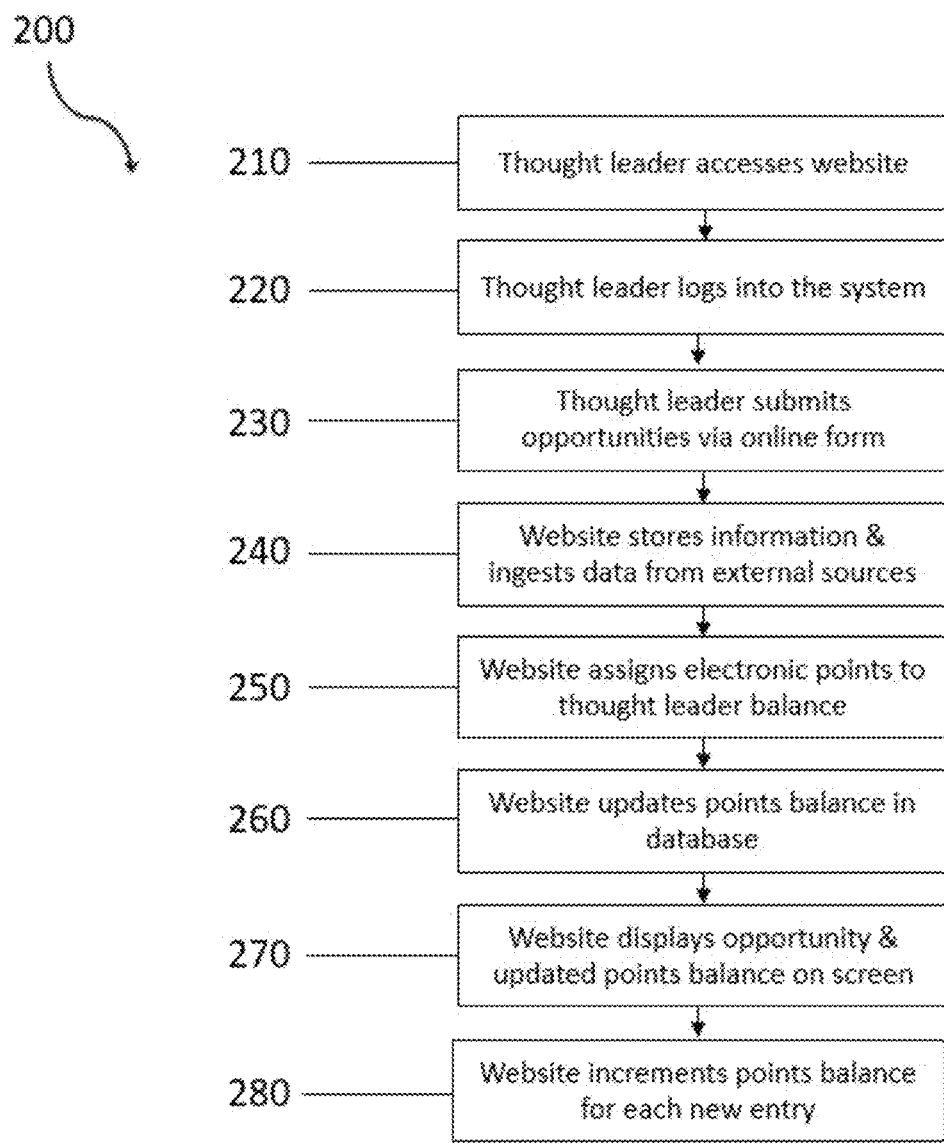
FIG. 2 shows the process for sharing unpublished thought leader opportunities specific to the sub-process of submitting opportunities and gaining points.

FIG. 2 shows one inventive process for sharing unpublished thought leader opportunities specific to the sub-process of submitting opportunities and gaining points. Generally, in a submit unpublished opportunities algorithm 200, thought leaders use the website to share unpublished opportunities with other users in a thought leader group, who are preferably registered with the inventive system. Example opportunities include authoring opportunities, media opportunities, and speaking opportunities, among others.

Authoring opportunities may include book writing opportunities with sourcing editors, editorial contacts for op-ed or column pitches at leading publications, and freelancing opportunities for contributing feature articles at leading publications, for example. Media opportunities may include quote opportunities with publications researching a story, as well as interview opportunities with radio and television news outlets. Speaking opportunities may include panelist, speaker or keynote opportunities with organizations looking for subject matter experts. Additionally, thought leaders can post opportunities for other thought leaders to assist them in their own personal projects as well. For example, they may requests help reviewing a book chapter, whitepaper, article, blog, or presentation, among other topics.

In a site access act 210, the algorithm 200 proceeds to where the thought leader accesses the interactive website by using a computing device such as a smartphone, tablet, laptop, desktop PC or other end user computing input/output device.

Next, in a system log in act 220, the thought leader logs into the interactive website by either following a first-time registration process or by using pre-established credentials such as a username and password combination. Of course, sometimes it is advantageous to use third party log-in systems such as those provided by LinkedIn and Twitter, for example.

Then, in a form submission act 230, the thought leader submits an opportunity by using an online form presented by the interactive website (such as shown in FIG. 7, which shows a sample online form for submitting unpublished opportunities with the public speaking opportunity chosen as an example). The thought leader enters information such as opportunity title, requirements, payment amount or range, date required, audience size (if a public appearance), information about the company seeking the service, and the company contact. This can include contact name, contact email address, contact phone number, company name, links to the contact and company information (e.g. via Twitter, LinkedIn and personal/corporate web sites) and other information.

As part of the form submission act 230, the thought leader may submit or forward additional details about this opportunity such as e-mails or electronic documents which can further aid the system and the recipient thought leader in verifying the authenticity, accuracy and/or details of the opportunity, in cases where one or more of these attributes need to be verified.

Next, in a database update act 240, the interactive website stores the submitted information along with information and meta-data pertaining to the source of the submission (i.e. submitter name, date and time of submission, etc.) into an information repository. The interactive website also augments/completes the submission into this information repository by retrieving and ingesting related data from external sources. For example, given the company name provided by the thought leader in the original submission, the interactive website may ingest information providing more details on this company in terms of company location, company type (i.e. public, private or non-profit), market capitalization, revenues, number of employees, industry classification, investors and other useful criteria for subsequent sharing with thought leaders who are viewing, browsing or searching the opportunity listings.

Following the database update act 240, in an assign points act 250, the interactive website assigns electronic points to the thought leader balance based on the value of their submission and in an update points act 260 increments their points total in an electronic database. The value of the submission is pre-determined by the system and can be a fixed value based solely on opportunity type or a variable value based upon a number of factors such as the requesting company, the income potential or income range of the opportunity, the size of the target audience and so on. In an alternative embodiment of the invention, the same (or a similar) algorithm rates and ranks thought leaders themselves (described later in FIG. 4), can also be adapted to rate—i.e. score—the value of a submitted or redeemed opportunity based upon similar dimensions that take into account the fundamentals of audience and anticipated impact.

For each contact or opportunity shared with the group via an online submission form, the thought leader may gain points that can be later utilized to unlock other contacts and opportunities of interest which were submitted by other members. In addition to earning points for sharing contacts and opportunities, thought leaders may also purchase points from the interactive website for later redemption.

In addition to thought leaders sharing unpublished opportunities with one another, corporations, organizations, associations, agencies, media, public relations and other associated service providers may also post opportunities that they are looking to fill. These are typically not job or career opportunities, but rather specific engagements for thought leaders pertinent to authoring, media and speaking or other opportunities pertinent to their profession.

In a submission confirmation act 270, the interactive website displays the submitted opportunity on screen in its published format, displays the updated points balance for the thought leader, and displays an acknowledgement message so that the thought leader knows the submission was successful. As an optional act, the interactive website may send a confirmation e-mail or other form of electronic message (such as text or an instant message) to the thought leader to confirm the newly updated points balance and allow sharing with other interested parties.

In a repeat per submission query 280, the algorithm 200 determines whether or not to repeat acts 210 to 270 based on whether or not the thought leader wishes to make another submission. In other words, the acts 210-270 may be repeated at any time by the thought leader with the result being that the interactive website will increment the thought leaders electronic points balance for each new submission accordingly.

Figure 3:
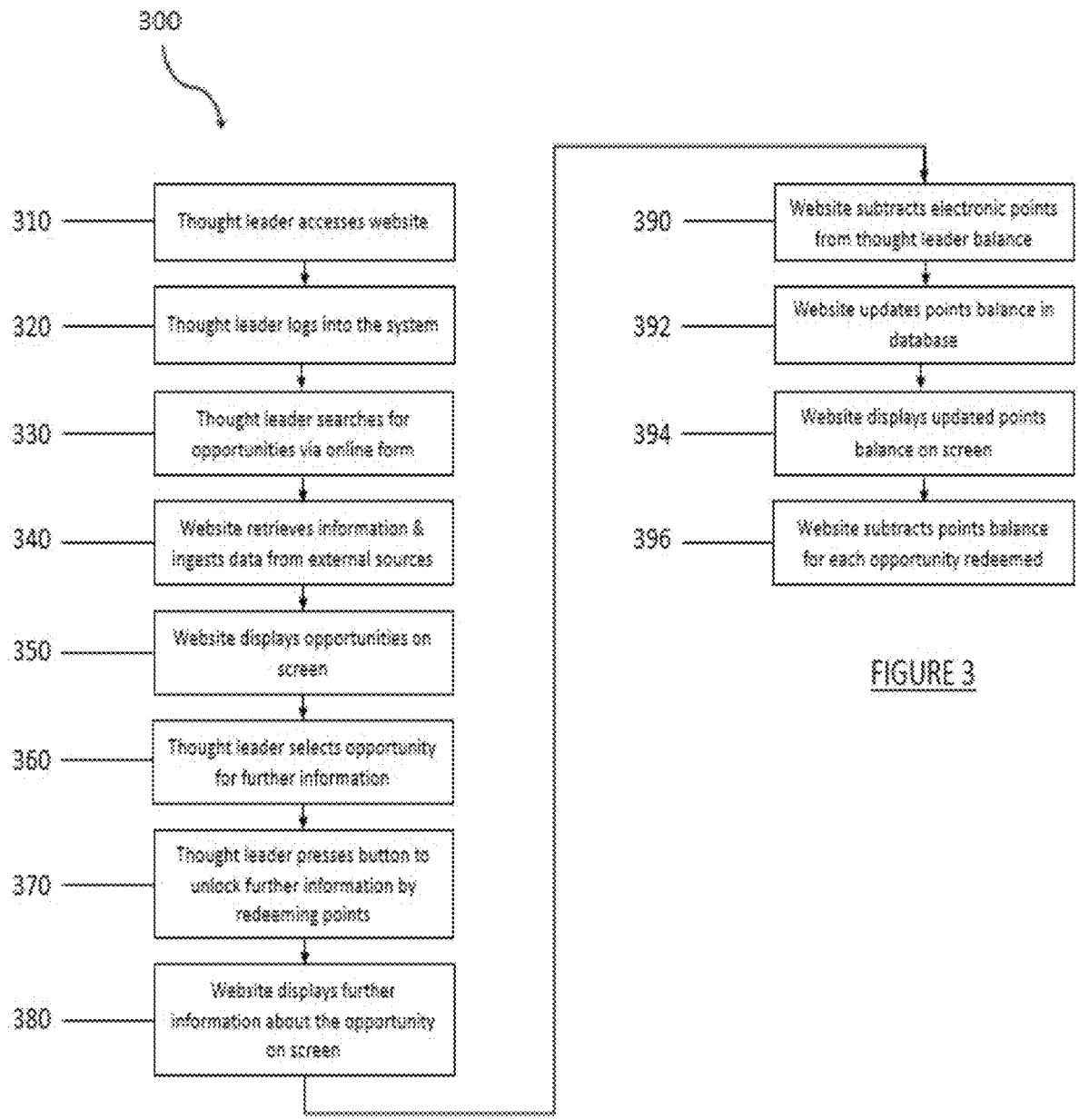
FIG. 3 shows the process for sharing unpublished thought leader opportunities specific to the sub-process of searching for opportunities and redeeming points.

FIG. 3 shows a process for sharing unpublished thought leader opportunities specific to a sub-process of searching for opportunities and redeeming points. In a retrieve unpublished opportunities algorithm 300, thought leaders use the website to search for, retrieve and respond to unpublished opportunities in the field of authoring opportunities, media opportunities, speaking opportunities and other opportunities pertinent to their profession.

The algorithm 300 begins with a site access act 310 in which a thought leader accesses the interactive website by using a computing device such as a smartphone, tablet, laptop, desktop PC or other end user computing device. Following the site access act 310, in a system log in act 320, the thought leader logs into the system by either following a first-time registration process or by using pre-established credentials such as username and password. The third party log in considerations outlined in the description of FIG. 2 apply equally here.

Next, in an opportunity search act 330, the thought leader browses or searches for opportunities by using an online form presented by the interactive website. The thought leader can browse listings of opportunities ordered by various sort criteria such as date of entry, location, category of opportunity or can search for opportunities by filling in search criteria and submitting a search request (such as shown in FIG. 8, which shows a sample opportunity listing report with sample search criteria provided as an example). Search criteria may relate to one or more pertinent information elements such as opportunity title, requirements, payment amount or range, date required, audience size (if a public appearance such as a panel or speaking opportunity), and information about the company seeking the service. Then, in an opportunity retrieval act 340, if act 330 pertains to a search request (as opposed to browsing) the interactive website retrieves a dataset of records from the information repository.

In an opportunity display act 350, the interactive website presents the dataset of records from the information repository in an ordered listing on screen. The displayed information for each opportunity listing may relate to one or more information elements such as opportunity title, requirements, payment amount or range, date required, audience size (if a public appearance such as a panel or speaking opportunity), and/or information about the company seeking the service (such as shown in FIG. 8).

In an opportunity selection act 360, the thought leader selects a specific opportunity for further information. Next, in an unlock opportunity act 370, the thought leader selects a button or other control on the interactive website to access further information about the specific opportunity (such as shown in FIG. 9, which shows a sample opportunity detail form with sample points redemption buttons provided as an example.). Following the unlock opportunity act 370, in a display further information act 380, the website displays further information about the specific opportunity on screen.

This further information includes items for following up on the opportunity, such as contact name, contact email address, contact phone number, company name, links to the contact and company information (e.g. via Twitter, LinkedIn, other social networks and personal/corporate web sites) and other relevant information which may aid the thought leader in understanding the nature of the opportunity. As an example, other relevant information may include company location, market capitalization, revenues, number of employees, industry classification and/or other useful criteria.

Next, in a determine points to deduct act 390, the interactive website subtracts electronic points from the thought leader balance based on the value of their redemption and, in the deduct points from balance act 392, subtracts these points from their points total in the electronic database. As discussed in acts 250 and 260, the value of the redemption is pre-determined by the system and can be a fixed value based on solely on opportunity type, or a variable value based upon a number of factors such as the requesting company, the income potential or income range of the opportunity, or the size of the target audience, for example. In addition to redeeming existing points for sharing contacts and opportunities, thought leaders may also purchase points from the interactive website for redemption. In an alternative embodiment of the invention, the algorithm that rates and ranks thought leaders can also be adapted to rate (i.e. score) the value of a submitted or redeemed opportunity based upon similar dimensions that take into account the fundamentals of audience and impact.

The algorithm 300 then proceeds to a display updated points balance act 394 in which the interactive website displays the updated points balance for the thought leader and displays an acknowledgement message so that the thought leader knows the redemption was successful. As an optional step, the interactive website may send a confirmation e-mail or other form of electronic message such as an instant message to the thought leader to confirm the newly updated points balance and allow sharing with other interested parties, including both registered and unregistered individuals. Next, in the repeat per redemption act 396, the entirety of acts 310 to 394 may be repeated by the thought leader such that the interactive website will subtract from the thought leader's electronic points balance for each new redemption.

Process for Rating and Ranking Thought Leaders

Figure 4:
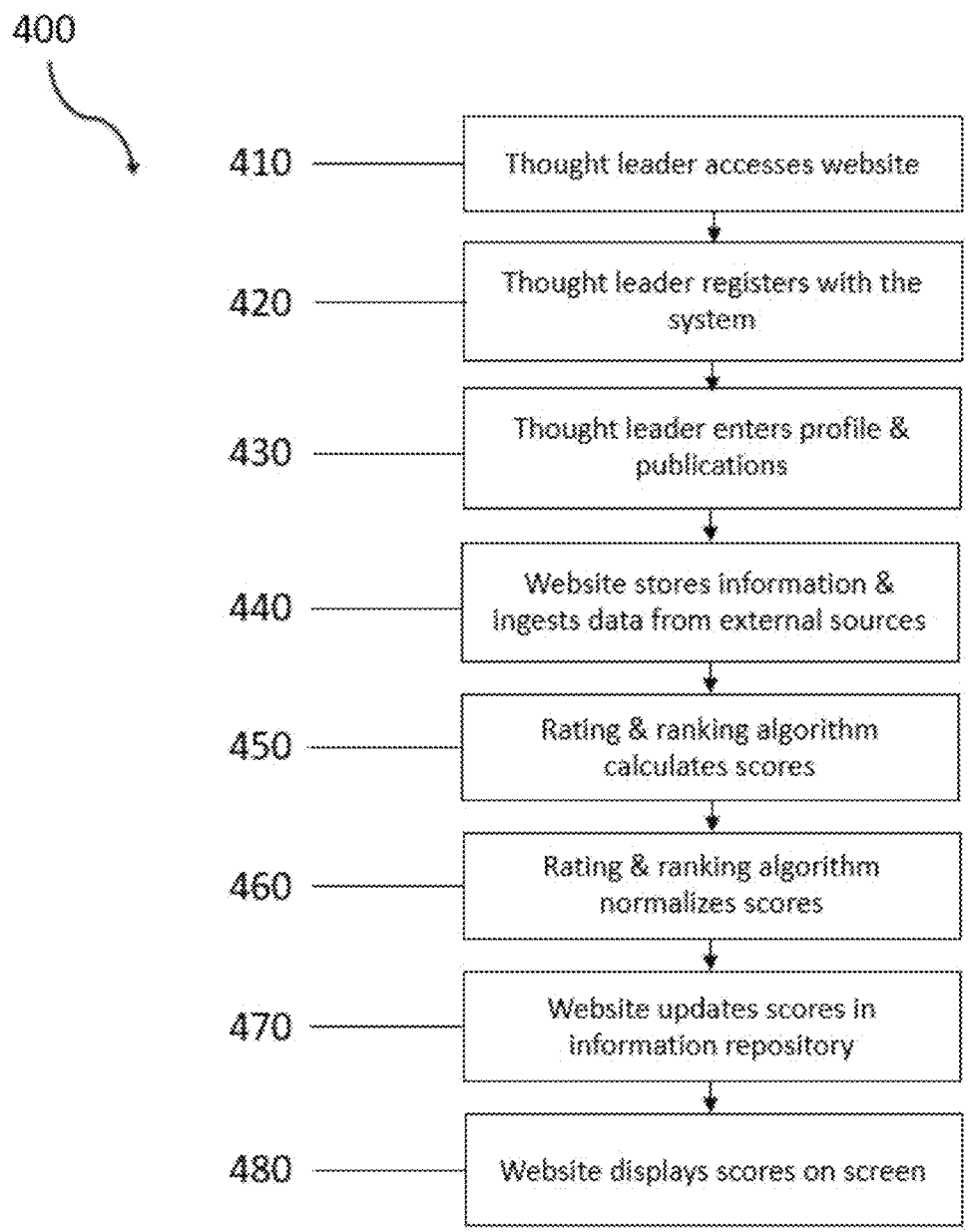
FIG. 4 shows the overall process for rating and ranking thought leaders with data inputs and outputs.
Figure 5:
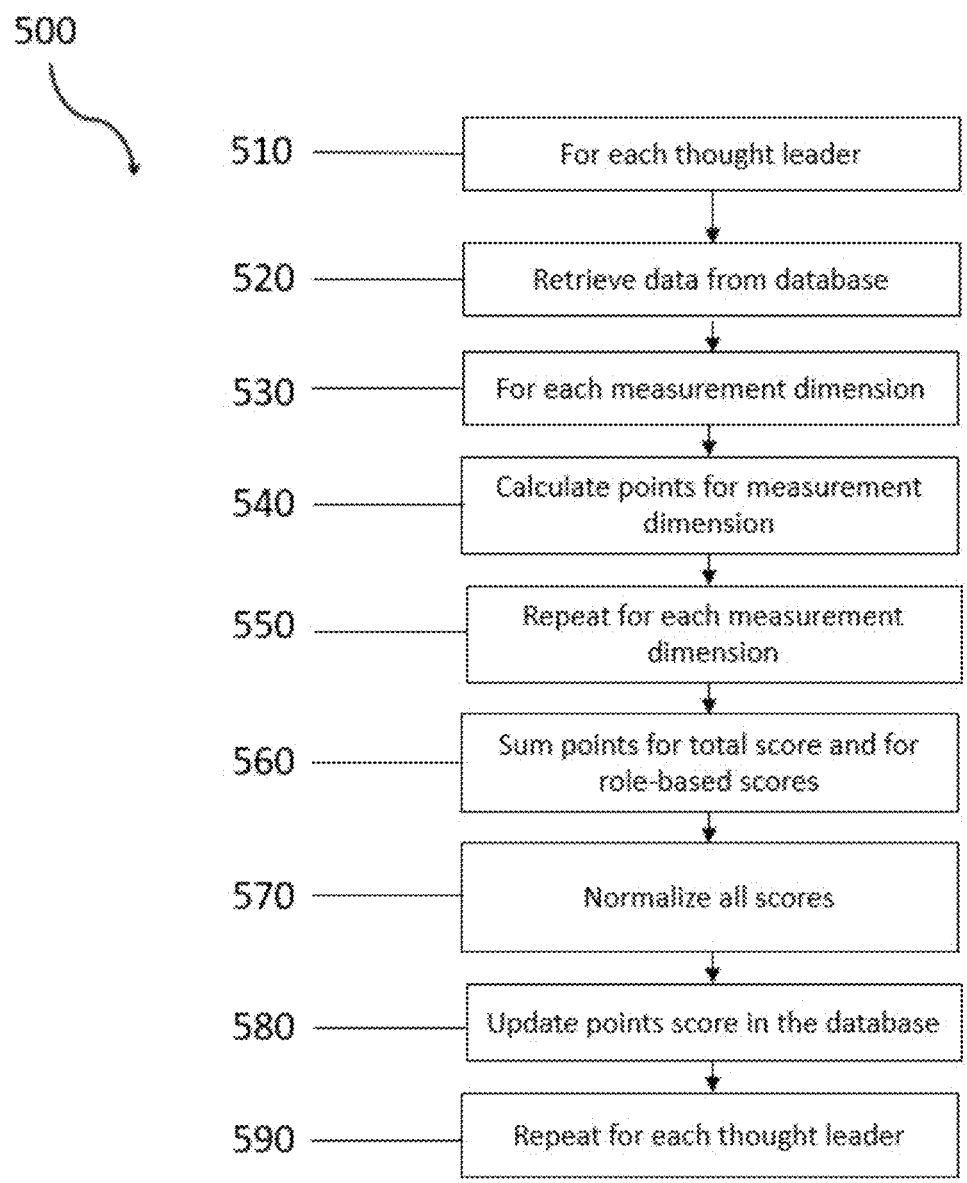
FIG. 5 shows the process for rating and ranking thought leaders specific to the thought leader rating and ranking algorithm.

Now with simultaneous reference to FIGS. 4 and 5, in which FIG. 4 shows an overall process for rating and ranking thought leaders with data inputs and outputs, while FIG. 5 shows a process for rating and ranking thought leaders specific to the thought leader rating and ranking algorithm. Algorithm 400 and algorithm 500 relate to rating and ranking thought leaders via the use of an electronic algorithm. The algorithm 400, a first rating and ranking process algorithm, pertains to the overall process of rating and ranking thought leaders with data inputs and outputs, whereas the algorithm 500 is a second rating and ranking algorithm, which pertains to a sub-process of the rating and ranking calculations performed by the electronic algorithm.

In a site access act 410, a thought leader accesses the interactive website by using a computing device such as a smartphone, tablet, laptop, desktop PC or other end user computing device. Next, in a system log in act 420, the thought leader logs into the system by either following a first-time registration process or by using pre-established credentials such as a username and password combination. The third party log in considerations outlined in FIG. 2 also apply here. Then, in a thought leader registration act 430, when a thought leader follows the first-time registration process to register with the system, they enter their profile information and their role-based academic, author, entrepreneur, inventor, influencer and speaker credentials via a web-based form. The thought leader is preferably able to also enter information about one or more of these roles based on their current level of experience and their portfolio of intellectual property.

Intellectual property includes not only tangible intellectual property (such as articles, books, citations, quotes, patents, videos, and the like) but also awards and recognition received by the thought leader which can be utilized to demonstrate the impact their new ideas and new ways of thinking—manifested via their intellectual property—have had on specific functional domains. In this act 430, information can be entered manually, but also retrieved via the application programming interfaces (APIs) of sites such as LinkedIn and Twitter, and updated automatically via these feeds. For example, ongoing posts to a regular blog can be automatically retrieved to update the thought leaders' profile, their ranking and score, and their thought leadership.

When a thought leader enters their profile and publications, or updates their portfolio, or when the system schedules an automated update (via data ingestion from various feeds sourced across the Internet), the system can optionally utilize technologies such as blockchain and/or related "altchains" in order to either a) validate thought leader awards and certifications by reading records already written to the blockchain or related "altchain" via a $3^{rd}$ party credential provider or guarantor, or b) write a record to a blockchain or related "altchain" itself acting as the $3^{rd}$ party credential provider or guarantor in order to aid with issuing, managing and validating said awards and certifications for the purposes of ensuring transparency and authenticity for interested parties.

The electronic library of the thought leader's collected works is compiled by both manual and automated mechanisms on a continuous basis to curate the thought leader's full (entire) available content portfolio which may include content in the form of meta-data from published articles, blogs, books, keynotes, media interviews, panels, podcasts, social channels, videos, webinars and whitepapers gathered from multiple sources across the Internet, as well as awards and certifications, for example.

Next, in a database update act 440, the interactive website stores the submitted information along with information and meta-data pertaining to the source of the submission into an information repository and completes the submission into the information repository by retrieving and ingesting related data from external data sources. For example, given a speaking event provided by the thought leader in an original submission, the interactive website may ingest information providing more details on this speaking event in terms of host company, company location, market capitalization, annual revenues, number of employees, industry classification and other useful criteria. Then, in a score calculation act 450, the first thought leader rating and ranking algorithm 400 calculates scores for the thought leader, both overall (aggregate total), within specific role-based domains and within specific functional domains (topic areas such as business strategy, technology strategy, digital transformation, emerging technology, disruptive technology, open innovation, innovation management, mobile, social, analytics, cloud, internet of things, artificial intelligence, intelligent automation, and/or blockchain, cybersecurity, for example).

Figure 10:
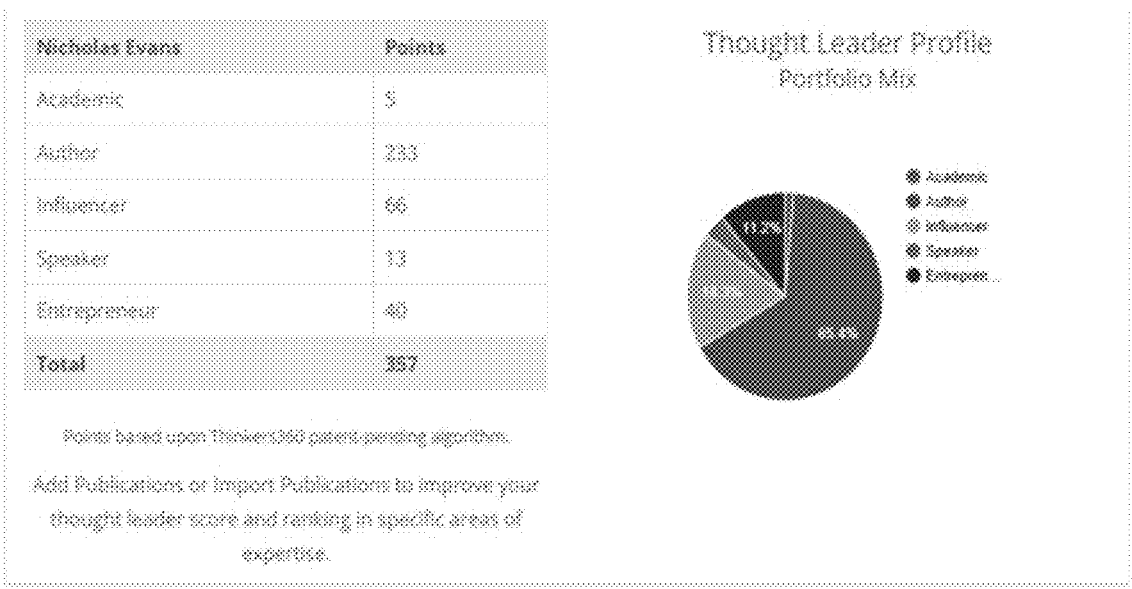
FIG. 10 shows a sample thought leader dashboard including portfolio mix.
Figure 11:
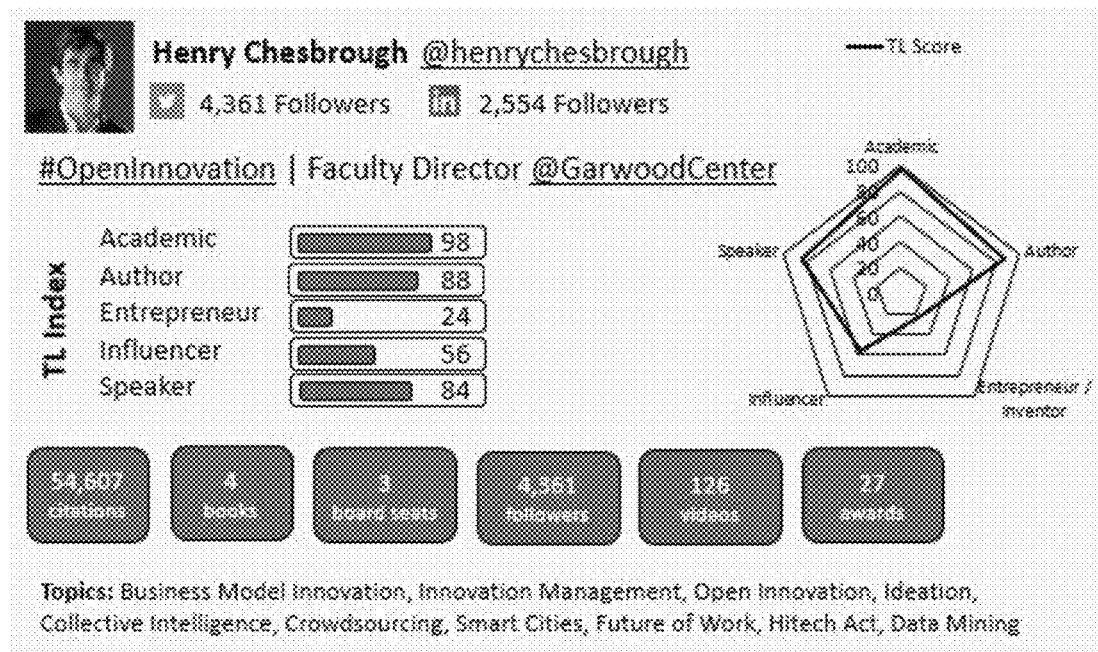
FIG. 11 shows a sample thought leader dashboard.

In a score normalization act 460, the first thought leader rating and ranking algorithm 400 normalizes the score of the thought leader by dividing each overall, role-based and functional domain score by those of the corresponding highest scoring thought leader in the information repository. Next, in a database update act 470, the interactive website updates these newly calculated scores in the information repository. After the database update act 470, in a profile display act 480, the interactive website displays these scores on screen. The information is presented visually via an online profile which includes a dashboard which includes the thought leaders' photograph, biography, overall score, role-based domain scores and functional domain scores and associated rankings. All scores may be presented in a variety of chart types such as bar charts, spider charts, progress gauges (digital or analog), or other forms of visualization (such as shown in FIGS. 10 and 11). FIG. 10 shows a sample thought leader dashboard including portfolio mix. FIG. 11 shows a sample thought leader dashboard.

Figure 12:
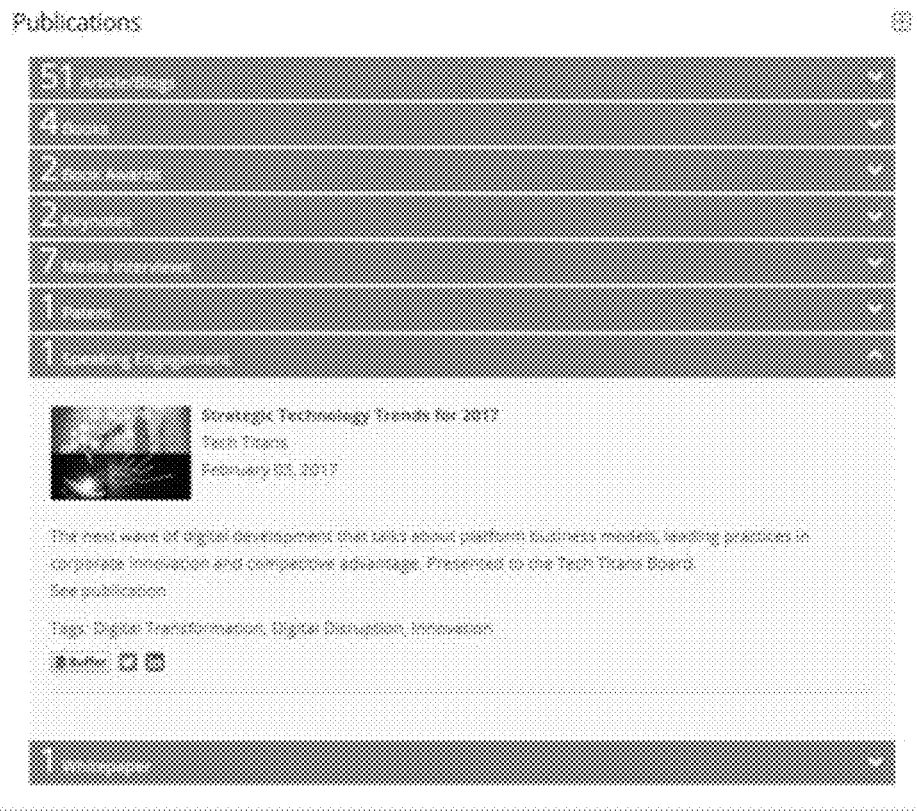
FIG. 12 a sample thought leader profile which can include a full portfolio of the thought leader's collected works.
Figure 13:
FIG. 13 shows a sample thought leader profile which can include a full portfolio of the thought leader's collected works.

In addition to the dashboard, the online profile presents a full portfolio of the thought leaders' collected works organized into specific domains for their academic, author, entrepreneur/inventor, influencer and speaker role-based intellectual property and their functional domain-based intellectual property. Information for each of these domains may be expanded or collapsed on screen in order to deep-dive into each specific area and access their content (as shown in FIGS. 12 and 13). FIGS. 12 and 13 show a sample thought leader profile which can include a full portfolio of the thought leader's collected works.

Algorithm for Rating and Ranking Thought Leaders

In the second rating and ranking algorithm 500, a score calculation act 450 and a score normalization act 460 are described in greater detail so as to calculate a thought leader's score and ranking by looking across a plurality of dimensions including quantitative measures such as an academic, author, entrepreneur/inventor, influencer and speaker. Next, in a begin rating and ranking act 510, the process begins for each thought leader whose score and ranking is being evaluated. Then, in a data retrieval act 520, the interactive website retrieves the relevant records from the database.

Next, in a data categorization act 530, the algorithm 500 continues for each measurement dimension for which the thought leader's score and ranking are being evaluated. Measurement dimensions can include both role-based measurement dimensions (e.g. academic, author, entrepreneur/inventor, influencer, and/or speaker, for example) as well as other measurement dimensions such as those pertaining to specific functional or industry domains (previously discussed). In a score calculation act 540, the algorithm 500 calculates the thought leader's points for the measurement dimension being evaluated. Within each dimension, points are assigned based upon the volume of output (a measure of audience and reach) as well as the authority of each outlet, publication, channel or event (a measure of impact and influence) (see Algorithm 1, below, which shows one mathematical formula for calculating thought leader scores).

$$\text{Score}(TL) = \text{Sum}_{1 \text{ to } r}(TLA \text{ at Tier}_n * PA \text{ for Tier}_n) \qquad \text{Algorithm 1}$$

Where:
  TL is a variable representing a thought leader
  TLA represents the number of thought leader artifacts
  Artifacts can include academic citations, publications, patents, followers, speaking engagements or other measures pertinent to a specific role-based domain
  $\text{Tier}_n$ is the tier level (1 through n) for the specific role-based or functional domain
  PA represents the number of points awarded for each tier level on a sliding scale
$\text{Sum}_{1 \text{ to } r}$ represents the summation across all role-based domains (1 through r)

Algorithm 1—One mathematical formula for calculating thought leader scores.

EXAMPLE 1

As an example, within the author dimension, points are calculated based upon the number of books and articles published by the thought leader as well as the authority of these publications. For example, tier 1 may be top publications such as Forbes, Fortune, Harvard Business Review, New York Times, Wiley, whereas tier 2 may be publications such as national publications with lower total average circulation than tier 1. Similarly, tier 3 may be local media or self-published media with lower total average circulation than tier 2.

Continuing this example of the author dimension (an example of a role-based dimension), the total score for the dimension is calculated by multiplying the total number of books published by the thought leader at each tier by the points awarded for that tier for each sub-dimension such as books or articles. Points for each tier within each sub-dimension such as books or articles are pre-determined to ensure a suitable delta between each tier level such as a 1-3-5 scale, 1-3-9 scale or 1-10-100 scale and a suitable delta between each sub-dimension such as a 40× multiplier for points awards for books over articles. Further, each dimension may comprise a tag identifier, such that information can be tagged to correlate that information to a dimension. Accordingly, a scoring algorithm may identify specific information for scoring across unique segments of individuals.

The example below shows a sample thought leader score calculation specific to the author role-based dimension and the books sub-dimension. In another aspect, the example below shows an example points calculation for the author dimension using the number of books published by the thought leader and the tier level for each book.

Example: Thought leader artifacts include 4 books at Tier 1, 4 books at Tier 2 and 2 books at Tier 3 Number of points awarded is 9 points for Tier 1, 3 points for Tier 2 and 1 point for Tier 3

$$\text{Score } (TL) = (4@T_1 * 9) + (4@T_2 * 3) + (2@T_3 * 1)$$
$$= (4*9) + (4*3) + (2*1)$$
$$= 36 + 12 + 2$$
$$= 50 \text{ points}$$

Example: A sample thought leader score calculation specific to the author role-based dimension and the books sub-dimension.

Table 1 shows sample data for rating and ranking thought leaders across the role-based dimensions of academic, author, entrepreneur/inventor, influencer and speaker. In reviewing Table 1 we see that the thought leader has 4 books at tier 1 (36 points), 4 books at tier 2 (12 points), and 2 books at tier 3 (2 points) for a total point score of 50. In this example, the same calculation would be run for the thought leader's other publications, such as articles, and this would be added to the book total to provide the total score for the author dimension.

TABLE 1

Sample data for rating and ranking thought leaders across the role-based dimensions of academic, author, entrepreneur/inventor, influencer and speaker.

| Dimension | Audience Level | Impact Level |
| --- | --- | --- |
| Academic | # of citations | Tier of publications |
| Author | # of publications | Tier of publications |
| Entrepreneur/Inventor | # of patents | Tier of citations |
| Influencer | # of followers | Tier of channels |
| Speaker | # of engagements | Tier of speaking engagements |
| Nicholas D. Evans (Example) | | |
| Academic | 251 citations (Google Scholar) | Tier 1 (Financial Times Prentice Hall) |
| Author | 10 Books (Amazon Author Page) | 4 @ Tier 1 (Financial Times Prentice Hall); 4 @ Tier 2 (British Computer Society, Microsoft Press, Powersoft Press); 2 @ Tier 3 |
| Entrepreneur/Inventor | 1 Patent (Google Patents) | 1 @ Tier 1 (Patent cited by Amazon, Google, IBM, Microsoft, etc.) |
| Influencer | 2872 Twitter & 3435 LinkedIn | 2 @ T2 (LinkedIn, Twitter) |
| Speaker | # of engagements | . . . |
| Henry Chesbrough (Example) | | |
| Academic | 54,607 citations (Google Scholar) | . . . |
| Author | 4 Books (Amazon Author Page) | . . . |
| Entrepreneur/Inventor | 0 Patents (Google Patents) | . . . |
| Influencer | 4362 Twitter & 2553 LinkedIn | . . . |
| Speaker | # of engagements | . . . |

EXAMPLE 2

As an example within the functional dimension, points are calculated based upon the number of content items (e.g. articles, blogs, books, keynotes, media interviews, panels, podcasts, social channels, videos, webinars, and whitepapers) published by the thought leader pertaining to this specific functional area (e.g. "Innovation", "Artificial Intelligence", "Blockchain", etc.) as well as the authority of these publications. In addition, points are further calculated by the addition of relevant awards and certifications pertaining to this specific functional area as well as the authority of these awards and certifications.

Here, the total score for the dimension is calculated by multiplying the total number of content items as well as awards and certifications published by or received by the thought leader at each tier by the points awarded for that tier for each sub-dimension such as articles, blogs, books, keynotes, media interviews, panels, podcasts, social channels, videos, webinars and whitepapers. Points for each tier within each sub-dimension such as books or articles are pre-determined to ensure a suitable delta between each tier level such as a 1-3-5 scale, 1-3-9 scale or 1-10-100 scale and a suitable delta between each sub-dimension such as a 40× multiplier for points awards for books over articles.

Table 2 shows sample data for rating and ranking thought leaders across a functional dimension of "Innovation". In studying Table 2 we see that the thought leader has 10 articles (10 points), 4 books (160 points), 2 book awards (20 points), 2 keynote presentations (10 points), 7 media interviews (21 points), 1 patent (40 points), 1 speaking engagement (3 points), and 1 whitepaper (5 points) for a total point score of 269. In this example, we assume all content is at a single tier level such as tier 2 for simplicity. In this example, the same calculation would be run for the thought leader's other functional areas of expertise, such as "Digital Transformation", and this would be utilized to provide the rating and ranking for this specific functional dimension.

TABLE 2

Sample data for rating and ranking thought leaders across a functional dimension.

| Nicholas D. Evans (Example) | Content Items (Example) | Points Per Item (Example) | Points Score |
|---|---|---|---|
| Academic Author | 10 Articles | 1 point | 10 points |
| | 4 Books | 40 points | 160 points |
| | 2 Book Awards | 10 points | 20 points |
| | 1 Whitepaper | 5 points | 5 points |
| Entrepreneur/ Inventor | 1 Patent | 40 points | 40 points |
| Influencer | 7 Media Interviews | 3 points | 21 points |
| Speaker | 2 Keynote Presentations | 5 points | 10 points |
| | 1 Speaking Engagement | 3 points | 3 points |
| Total Points | | | 269 points |

Figure 6:
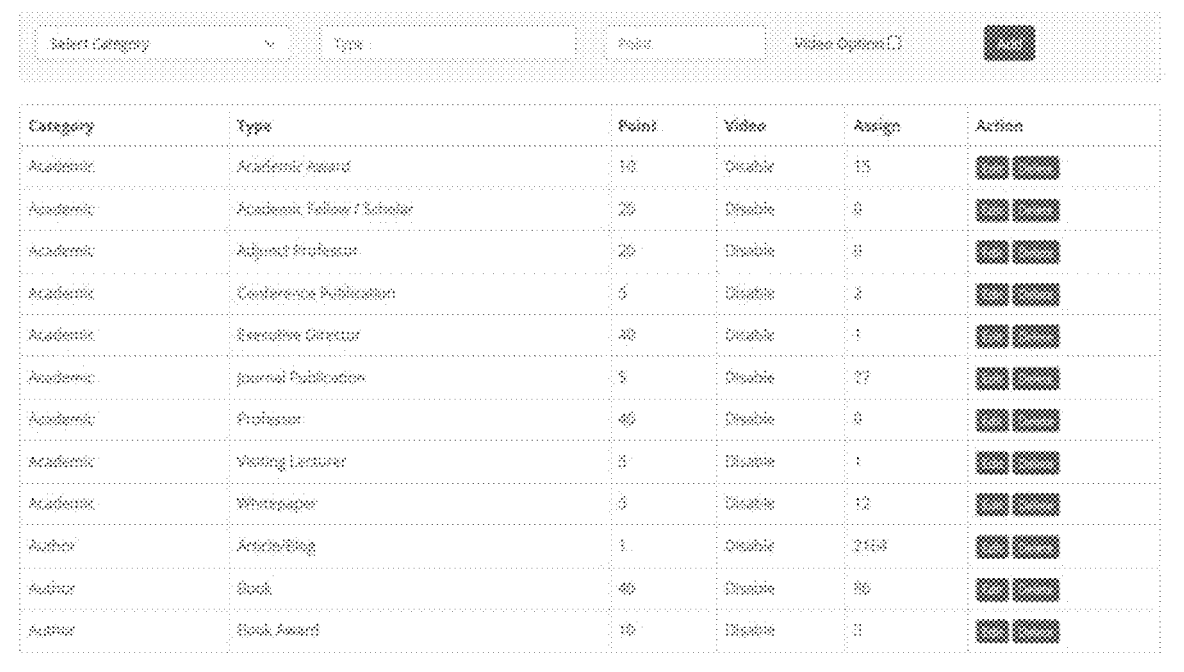

To continue with the discussion of FIG. 5, turn briefly to FIG. 6 which shows an example screen interface for how the points system can be managed and maintained within the computer software application by the application administrator.

Now, returning to the discussion of the algorithm 500, in a repeat score calculation act 550, the algorithm repeats step 540 for each measurement dimension, and sub-measurement dimension where applicable, as described in step 530. Next, in a score summation act 560, the algorithm 500 calculates the overall total score and the total score for each measurement dimension by summing all sub-measurement dimensions (e.g. books, articles) for the measurement dimension score (e.g. author dimension) and by summing all measurement dimensions for the total score. Then, in a score normalization act 570, the overall total score and the total score for each measurement dimension are then normalized by dividing the specific score by the total score of the highest scoring thought leader in that specific dimension and converting to a percentage. This will create and retain a score of 100% for the highest scoring thought leader and scores from 0% (or other suitable minimum percentage such as 20%) to 100% for the rest of the thought leader group being rated. In other embodiments, some other range or index may be substituted for a "%" score.

Thought leader scores for each measurement dimension can be calculated overall across all their collected works, but also within specific role-based and functional domains as previously defined. When calculating scores for each dimension within specific topic areas, the algorithm 500 searches for suitable categorization of each element of intellectual property.

For example, a book on digital transformation will count towards the thought leader's author dimension score for the topic area of digital transformation. The categorization of the intellectual property can either by entered manually at the time the publication is entered or inferred via the title of the publication or other web-accessible meta-data (such as the "Category" field in RSS feeds).

In a database update act 580, the algorithm 500 updates the points scores in the database connected to the interactive website. Then, in a repeat scoring act 590, the algorithm 500 repeats acts 510 to 580 for each thought leader. The algorithm 500 can be programmed to run based on event-based situations such as the publication of a new piece of intellectual property from a thought leader on the Internet, the manual entry of such a piece of intellectual property into the system, or the manual selection of a specific report or profile of the thought leader, or based on time-based situations such as a daily, weekly, or monthly re-calculation of the thought leaders score.

The thought leader rating and ranking algorithm may be dynamically adjusted in complexity (i.e. number of measurement dimensions and sub-dimensions, number of tiers, etc.) to permit real-time rating calculations based on a) the ease or difficulty of access to the internally and externally-sourced data inputs needed for calculation, b) the amount of time needed to perform these calculations by the algorithm, and/or c) the ease or difficulty of performing the calculations. These data inputs will typically be drawn from both the thought leader portfolio (the collected works) on the interactive web site and from various trustworthy external sources (such as Amazon Author Pages, Google Patents, LinkedIn, TED, Twitter and others) on a real-time basis as these thought leader metrics vary such as number of social media followers and number of academic and patent citations, and as thought leaders produce new intellectual property. Further, block-chain ledgers may be used to verify identified content with a trusted authentic source of that content. By specially identifying users with one or more verified 'facts', including block-chain verified facts, 'fake followers' and 'fake users' can be identified and eliminated from systems that employ the invention. In addition, the exact timing of reading from and writing to the database may be adjusted in electronic implementations of this system and method to gain the most speed and efficiency in use of computational resources and to optimize the end user experience.

Process for Identifying, Cultivating and Managing Thought Leaders

Figure 17:
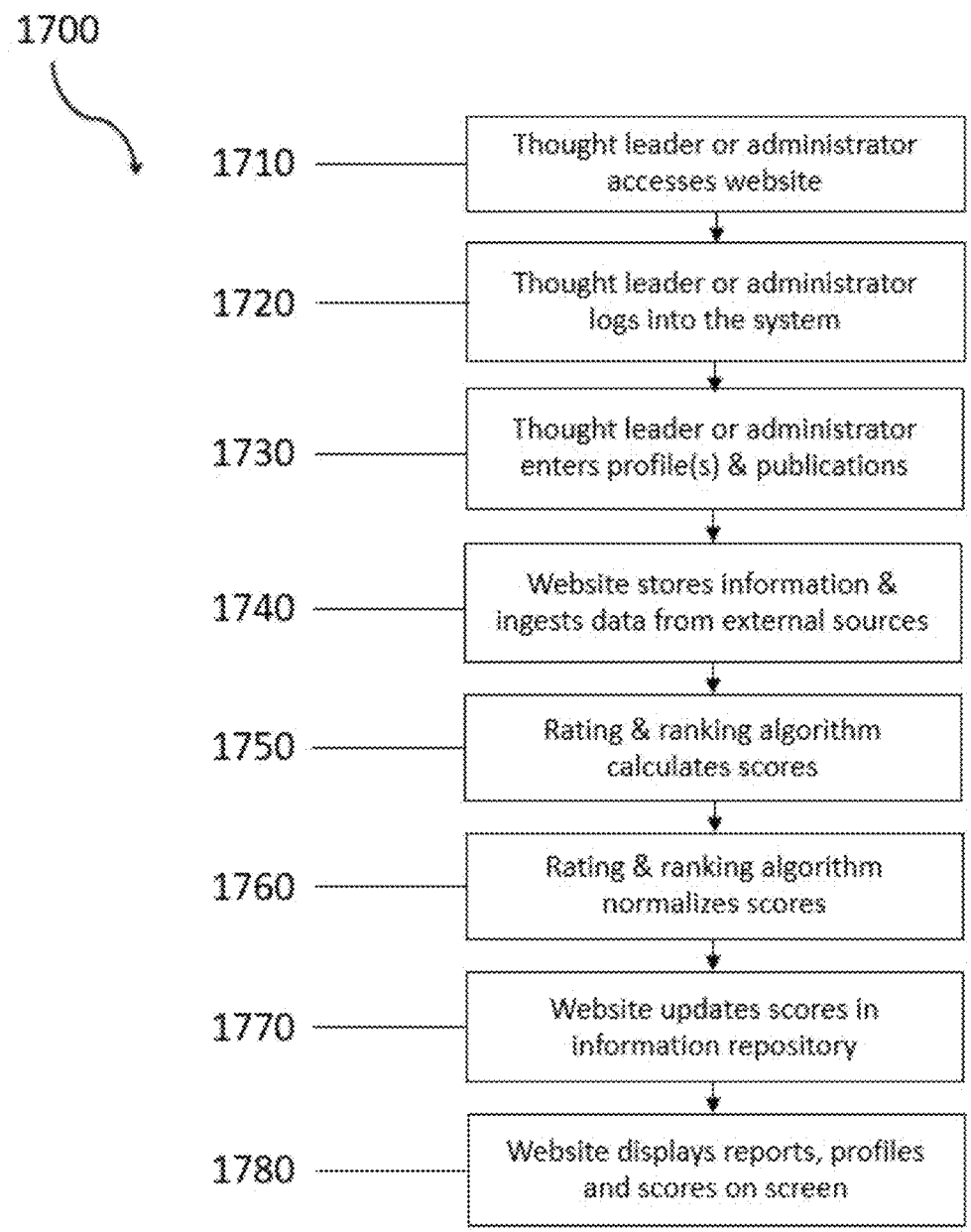
FIG. 17 shows the process for entering, searching and viewing thought leader profiles, dashboards and standings.

FIG. 17 shows the process for entering, searching and viewing thought leader profiles, dashboards and standings. In an enter, search and view thought leader profiles, dashboard and standings algorithm 1700, thought leaders, marketers or company administrators are able to enter profiles, search across a plurality of profiles, and view individual profiles, listings of profiles, as well as an overall directory, performance report, and standings for thought leaders belonging to a specific company or organization or across the entire system.

The algorithm 1700 begins in a site access act 1710, in which a thought leader, marketer or company administrator accesses the interactive website by using a computing device such as a smartphone, tablet, laptop, desktop PC or other end user computing device. Next, in a system log in act 1720, the thought leader, marketer or company administrator logs into the system by either following a first-time registration process or by using pre-established credentials such as a username and password combination. The third party log in considerations outlined in FIG. 2's discussion apply here as well.

In a thought leader registration act 1730, the process is similar to act 430 with the additional ability for marketers or company administrators to register thought leaders belonging to the same company or affiliated with the same company on behalf of those thought leaders. In this act, thought leaders, marketers and company administrators may also add additional information specific to company objectives for influencer, expert or thought leader marketing (for example, for corporate communications, public relations and/or marketing objectives) such as whether or not the thought leader is media trained (i.e. trained in communicating with external media organizations), the completion date or dates of such media training, the date of the last media training, and the number of years of media experience.

In a database update act 1740, the process is also similar to act 440 with the result that the interactive website stores the submitted information along with information and metadata pertaining to the source of the submission into an information repository. Then, in a score calculation act 1750, the process is similar to act 450 with the result that the thought leader rating and ranking algorithm calculates scores for each thought leader entered into the system.

In the score normalization act 1760, the process is identical or substantially similar to step 460 with the result that the thought leader rating and ranking algorithm normalizes the score of the thought leader. Here, an additional calculation normalizes the score solely based on thought leaders belonging to the specific company or affiliated with the specific company using the system to manage their own thought leaders. This provides the benefit of having the overall standings across all thought leaders, both internal and external to the company, but also overall standings solely within the internal and affiliated thought leader group.

Figure 14:
FIG. 14 shows a sample thought leader directory used in the enterprise edition of the interactive website.
Figure 16:
FIG. 16 shows a sample thought leader performance report used in the enterprise edition of the interactive website.

In a database update act 1770, the process is similar to act 470 with the result that the interactive website updates these newly calculated scores in the information repository. In a profile display act 1780, the process is similar to act 480 with the online profile including a dashboard with portfolio analytics and a full portfolio of the thought leaders' collected works, but also includes a variety of company-specific displays, such as the thought leader directory (as seen in FIG. 14, which shows a sample thought leader directory used in the enterprise edition of the interactive website), thought leader standings report (as seen in FIG. 15, which shows a sample thought leader standings report used in the enterprise edition of the interactive website), and thought leader performance report (as seen in FIG. 16, which shows a sample thought leader performance report used in the enterprise edition of the interactive website).

Figure 18:
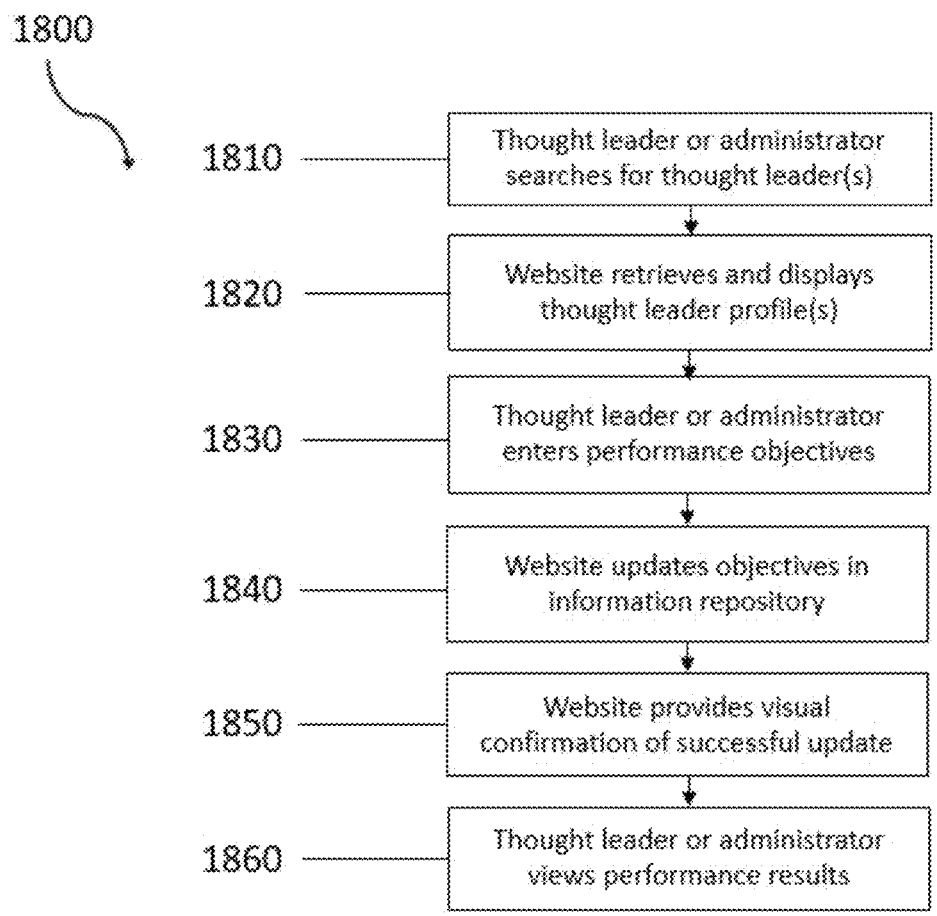
FIG. 18 shows the process for entering thought leader performance objectives and viewing performance results.

FIG. 18 shows the process for entering thought leader performance objectives and viewing performance results. In an enter thought leader performance objectives and view performance results algorithm 1800, thought leaders, marketers or company administrators are able to enter performance objectives for one or more thought leaders and view their performance results over time. Performance objectives may relate to monthly, quarterly or yearly targets relevant to their advancement as a thought leader and/or advancement of company objectives. For example, a sample performance objective for a thought leader may include 2 corporate blogs per quarter, 3 media interviews per quarter and 3 external articles per quarter, with a corresponding yearly total of 8 blogs, 12 media interviews and 12 external articles.

In a search for thought leader act 1810, thought leaders, marketers or company administrators are able to search for specific thought leaders by using search criteria such as name, title, business unit, geographic region, country, role-based domain area, functional domain area, industry domain area, portfolio mix or other such criteria. In terms of portfolio mix, a set of sliders ranging from 0% to 100% can be adjusted to search for thought leaders with a certain percentage of academic, author, entrepreneur, influencer, inventor and/or speaker in their portfolio. For example, search for thought leaders in the United States, with AI functional domain experience, who are also at least 40% influencer and 20% speaker.

Figure 19:
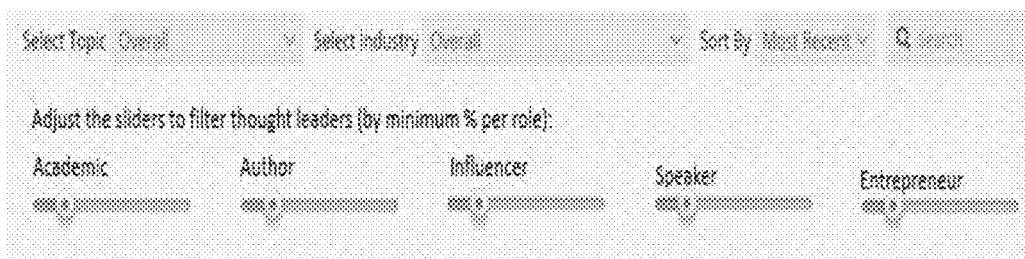
FIG. 19 shows an example search form specifically for adjusting a set of sliders to search for thought leaders with a certain percentage of academic, author, entrepreneur, influencer, inventor and/or speaker in their portfolio mix.

FIG. 19 shows an example search form specifically for adjusting a set of sliders to search for thought leaders with a certain percentage of academic, author, entrepreneur, influencer, inventor and/or speaker in their portfolio mix.

Next, in a retrieve and display thought leader profile act 1820, the interactive website retrieves the relevant records from the database and displays them on screen. In an enter thought leader performance objectives act 1830, the thought leader, marketer or company administrator enters performance objectives as described in the pre-amble for algorithm 1800. Use case scenarios for this act 1830 may include a specific thought leader entering his or her own personal objectives, a company administrator entering objectives for a group of thought leaders, as well as a marketer searching for thought leaders with a specific percentage of academic, author, entrepreneur, influencer, inventor and/or speaker in their portfolio mix.

The entry of performance objectives may also be assigned to specific company campaigns. For example, if the company wishes to generate more thought leadership related to the topic of the Internet of Things, they can set up additional performance objectives tied to Internet of Things-related blogs, media interviews and external articles, in addition to or as part of the overall performance objectives for specific thought leaders. In an update database act 1840, the system updates the performance objectives, and campaigns where applicable, to the database connected to the interactive website.

Then, in a view confirmation act 1850, the system provides a visual confirmation to the end user that the information was successfully submitted and saved to the database connected to the interactive website. In a view performance results act 1860, the thought leader or company administrator is able to view performance results for one or more thought leaders on screen (as seen in FIG. 16). This includes target versus actuals for each performance objective as well as the ability to manipulate the data visually—for example drilling down to explore more details or to compare and contrast different thought leaders or different groups of thought leaders—and to print or share results with others.

Figure 20:
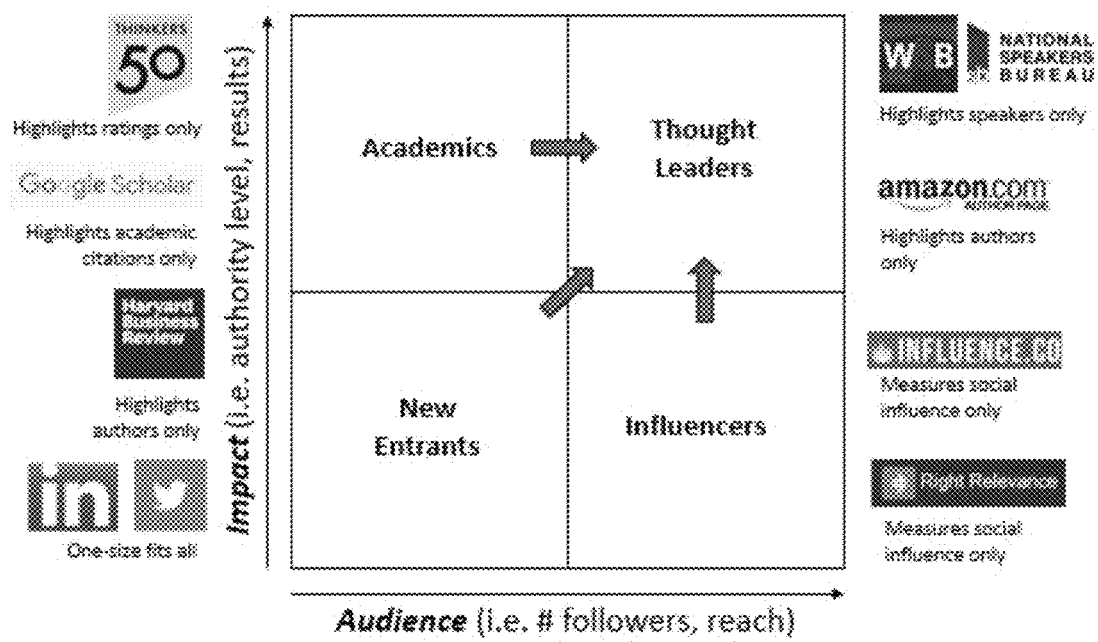
FIG. 20 shows the typical differences between new entrants, academics, influencers and thought leaders on a 2×2 matrix.

FIG. 20 shows the typical differences between new entrants, academics, influencers and thought leaders on a 2×2 matrix.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

I claim:

1. An information processing system for rating or ranking individual users as thought leaders and influencers, the information processing system comprising:
 a memory;

a processor communicatively coupled to the memory; and a rating and ranking module communicatively coupled to the memory and the processor, wherein the rating and ranking module is configured to perform a method comprising obtaining at least one information from a user, identifying, based on the information obtained, at least one third-party source of additional information;

obtaining at least one information from a third-party database, wherein the information comprises at least one user-created content, data related to one of a user-created content, data related to a user role, and data related to a user;

curating a plurality of user-related content;

executing a rating and ranking algorithm as a function of, in part, the information, wherein each of a plurality of users is rated as a separate executable instance to generate a rating for each of the plurality of users as a score for that user;

verifying the authenticity of at least one information via a block-chain ledger;

calculating a score for at least a functional domain;

calculating a score for at least a role-based or persona-based domain;

analyzing the rating of each of the plurality of users;

ranking each of the plurality of users relative to each other user;

directing the storage of the information, the score, and the ranking for each user in an information repository;

sending displayable data related to a plurality of ranked users to at least a first system for user input/output, whereby the first system for user input/output displays the displayable data displays the displayable data for a user;

a thought leader accessing an interactive website;

the thought leader logging into the system;

when the thought leader accesses the system for the first time, the thought leader registering with the system;

storing the submitted information in a database, the information being stored along with information and metadata pertaining to the source of the submission into an information repository;

calculating a score in which the thought leader rating and ranking algorithm calculates an aggregate score, at least one role-based or persona-based score, and at least one functional domain score for the thought leader;

normalizing the score, whereby the thought leader rating and ranking algorithm normalizes the score of the thought leader by dividing each overall, role-based and functional domain score by those of the corresponding highest scoring thought leader in the information repository;

updating the information repository with newly calculated scores via the interactive website; and displaying a profile, in which the interactive website displays at least one score.

2. The information processing system of claim 1, wherein information comprises intellectual property.

* * * * *